United States Patent
Mannheim Astete et al.

(10) Patent No.: US 11,618,236 B2
(45) Date of Patent: Apr. 4, 2023

(54) GLASS LAMINATE WITH INLAY OBSCURATION HAVING SUPERIOR STRENGTH AND OPTICAL QUALITY

(71) Applicant: AGP America S.A., Ciudad de Panama (PA)

(72) Inventors: Mario Arturo Mannheim Astete, Lima (PE); Charles S. Voeltzel, Lima (PE); Laura Granados Caro, Lima (PE); Andres Fernando Sarmiento Santos, Lima (PE); Elena K. Mendoza Carranza, Lima (PE); Merlyn Rojas Valle, Lima (PE)

(73) Assignee: AGP America S.A., Panama (PA)

( * ) Notice: Subject to any disclaimer, the term of this patent is extended or adjusted under 35 U.S.C. 154(b) by 148 days.

(21) Appl. No.: 16/651,138

(22) PCT Filed: Sep. 29, 2018

(86) PCT No.: PCT/IB2018/057593
§ 371 (c)(1),
(2) Date: Mar. 26, 2020

(87) PCT Pub. No.: WO2019/064279
PCT Pub. Date: Apr. 4, 2019

(65) Prior Publication Data
US 2020/0254731 A1    Aug. 13, 2020

Related U.S. Application Data

(60) Provisional application No. 62/566,227, filed on Sep. 29, 2017.

(51) Int. Cl.
*B32B 17/10* (2006.01)
*B32B 3/08* (2006.01)
(Continued)

(52) U.S. Cl.
CPC ........ *B32B 3/08* (2013.01); *B32B 17/10036* (2013.01); *B32B 17/1066* (2013.01);
(Continued)

(58) Field of Classification Search
CPC ........ B32B 17/10293; B32B 17/10036; B32B 17/10174; B32B 17/10568;
(Continued)

(56) References Cited

U.S. PATENT DOCUMENTS 4,551,372 A * 11/1985 Kunert ............. B32B 17/10293
428/81
2001/0019759 A1 * 9/2001 Barattucci ......... B32B 17/10036
428/192

(Continued)

FOREIGN PATENT DOCUMENTS

EP    1106343 A1    6/2001
EP    1193048 A2    4/2002
(Continued)

OTHER PUBLICATIONS

Office Action—Related U.S. Appl. No. 16/627,873.

*Primary Examiner* — Tahseen Khan
(74) *Attorney, Agent, or Firm* — The Morales Law Firm; Joseph L. Morales, Esq.

(57) ABSTRACT

The use of camera-based safety systems is growing at a rapid rate in modern automobiles. At the same time, windshields, where many of the cameras are mounted, are becoming larger and more complex in shape. As the industry moves towards vehicles with full autonomous capability, the number of cameras required and the resolution of the cameras are both increasing. However, the optical quality of the windshield is less than optimal. One of the problems is caused by the typical black enamel frit that is printed on the glass, prior to heating and bending, to hide or obscure the camera (Continued)

hardware. The abrupt thermal gradients during bending, caused by the heat absorbing black frit, result in a high level of distortion in the camera field of view. The object of this invention is to provide laminated automotive glazing having an obscuration area produced by creating an obscuration after heating and bending the glass by removing a portion of the plastic interlayer glass in or near the camera field of view (camera obscuration) or/and in the edges of the windshield (black band) and replacing it with an inlay made of a substantially opaque plastic or other suitable material in or near the camera field of view (camera obscuration) or/and in the edges of the windshield (black band) rather than printing and firing an enamel frit on the glass. This results in a laminate having superior optical quality, higher strength and a lower probability of breakage as compared to a laminate with a black enamel frit obscuration.

16 Claims, 8 Drawing Sheets

(51) Int. Cl.
 B32B 27/30 (2006.01)
 B32B 27/36 (2006.01)
 B32B 27/08 (2006.01)
 B60J 1/00 (2006.01)
 B60R 11/04 (2006.01)
 B60R 11/00 (2006.01)
(52) U.S. Cl.
 CPC .... *B32B 17/1077* (2013.01); *B32B 17/10174* (2013.01); *B32B 17/10293* (2013.01); *B32B 17/10568* (2013.01); *B32B 17/10743* (2013.01); *B32B 17/10761* (2013.01); *B32B 17/10788* (2013.01); *B32B 17/10908* (2013.01); *B32B 17/10935* (2013.01); *B32B 17/10981* (2013.01); *B32B 27/08* (2013.01); *B32B 27/30* (2013.01); *B32B 27/36* (2013.01); *B60J 1/001* (2013.01); *B32B 2307/306* (2013.01); *B32B 2307/4023* (2013.01); *B32B 2307/412* (2013.01); *B32B 2307/416* (2013.01); *B32B 2315/08* (2013.01); *B32B 2329/06* (2013.01); *B32B 2367/00* (2013.01); *B32B 2605/006* (2013.01); *B32B 2605/08* (2013.01); *B60R 11/04* (2013.01); *B60R 2011/0026* (2013.01)

(58) Field of Classification Search
 CPC .......... B32B 17/1066; B32B 17/10935; B32B 17/10981; B32B 17/10761; B32B 27/30; B32B 27/08; B32B 27/36; B32B 3/08; B60J 1/001
 USPC ........................................................ 428/172
 See application file for complete search history.

(56) References Cited

U.S. PATENT DOCUMENTS

| 2002/0039649 | A1* | 4/2002 | Nagai ............... B60J 1/002 428/328 |
| 2004/0160688 | A1* | 8/2004 | Noguchi ............ B32B 17/1055 359/883 |
| 2005/0142332 | A1 | 6/2005 | Sauer |
| 2011/0027515 | A1* | 2/2011 | Melcher ............ B32B 17/10761 428/63 |
| 2011/0199674 | A1* | 8/2011 | Melcher ............ B32B 17/10761 359/359 |
| 2015/0377595 | A1* | 12/2015 | Scarinci ............. B32B 17/1077 89/36.02 |
| 2016/0243796 | A1* | 8/2016 | Mannheim Astete ...................... B32B 17/1077 |
| 2016/0291324 | A1* | 10/2016 | Arndt ................ B32B 17/10568 |
| 2017/0232713 | A1* | 8/2017 | Mannheim Astete ...................... B32B 17/10284 428/172 |
| 2020/0122436 | A1 | 4/2020 | Mannheim Astete et al. |

FOREIGN PATENT DOCUMENTS

| EP | 1464632 A1 | 10/2004 |
| EP | 3248775 A1 | 11/2017 |
| FR | 2989319 A1 | 10/2013 |
| FR | 2998833 A1 | 6/2014 |
| GB | 2264452 A | 9/1993 |
| WO | 2018122770 A1 | 7/2018 |

* cited by examiner

GLASS LAMINATE WITH INLAY OBSCURATION HAVING SUPERIOR STRENGTH AND OPTICAL QUALITY

FIELD OF THE INVENTION

The presently disclosed invention is directed to a laminated automotive glazing having a camera obscuration which provides for a field of view having superior optical quality and strength as well as the method used to create said glazing.

BACKGROUND OF THE INVENTION

Black enamel frit obscurations are commonly printed on laminated and tempered automotive safety glazing. These obscurations have multiple functional and aesthetic requirements. The obscuration must be substantially opaque. This is needed to prevent the adhesive, used to mount the glazing to the vehicle, from being seen from the outside of the vehicle and to protect the adhesive from the harmful effects of ultra-violet. The obscuration also serves this same function for components attached to the inside surface of the glazing. On heated and coated glazing, the obscuration is used to hide the edge of the coating, bus bars, leads and any other items that would detract from the appearance of the vehicle. The obscuration also has the additional aesthetic requirement that it has a dark black color and a reflective glossy appearance. It must last for the life of the glazing, without fading, leaking, having a reduction in adhesion or otherwise failing.

The obscurations are usually printed on the fourth surface of the glass on the inside of the vehicle but are sometimes also or alternately printed on the second surface of the glass.

Obscurations have historically been black. One of the reasons for this comes from the limitations imposed by ceramic frits. It is difficult to produce frits, in colors other than black, that have the durability needed and for which the color can be reliably replicated from run to run. The other reason is that a black obscuration can be used with any color of paint.

Black enamel frits are comprised of pigments, a carrier, binders and finely ground glass. Other materials are also sometimes added to enhance certain properties: the firing temperature, anti-stick, chemical resistance, etc. The black frit is applied to the glass using a silk screen or ink jet printing process prior to heating and bending. During the bending process, the finely ground glass in the frit soften and fuses with the glass surface. The frit is said to be "fired" when this takes place. This is very similar to the process used to apply enamel finishes on bathroom fixtures, pottery, china and appliances.

Metals and many other types of materials have an ultimate yield strength at which point the material will fail. However, with glass we can only specify a probability of breakage for a given value of stress. Looking at glass at the molecular level, we would expect the strength to be very high. In fact, what we find in practice is that glass has a very high compressive strength, as expected, but very low tensile strength.

For a given set of glass test specimens, with identical loading, the point of failure at first glance might appear to be a random variable. In fact, the yield point follows a Weibull distribution and the probability of breakage can be calculated as a function of, stress, duration, surface area, surface defects and the modulus of glass.

To the naked eye, float glass appears to be near perfect. Any defects that may be present are so small as to not be visible. But, in fact, at the microscopic level, the surface appears rough and can be seen to be dotted with flaws. When the glass is placed in tension, these surface defects tend to open up and expand, eventually leading to failure. Therefore, laminated automotive glass almost always fails in tension. Even when not in tension, the surface defects react with the moisture in the environment and slowly "grow" over time. This phenomenon is known as slow crack growth. As a result, glass weakens as its ages.

A fired black frit increases surface defects. This can be seen if the black pigment of a fired black obscuration is chemically dissolved. The surface of glass will have a frosted appearance, similar to sand blasted or chemically etched glass. The frosted appearance is due to the myriad surface defects present from the fused glass. This makes the surface weaker increasing the probability of breakage. Testing has shown that glass with black frit fails at a stress level that is substantially lower than glass that does not have black frit.

Another problem arises from the thermal gradients that occur during the bending process. As one would expect, the black frit absorbs more radiant heat than the clear glass. Radiant heat is the predominant heat source used for glass bending. The black frit areas of the glass run hotter than the adjacent clear areas. With glass being a poor conductor of heat, gradients in the tens of degrees centigrade can arise over a short distance. These high abrupt thermal gradient on the surface result in optical distortion and high residual along the inner edge of the black band. This is known as the "burn" line in the industry. This can often be seen along the edges of the black obscuration found along the edges of most windshields.

As shown in FIG. 1, obscurations used with glass mounted camera systems are forced to designate a "buffer" 15 zone between the edge of the camera field of view 16 and the edge of the camera obscuration 34, 8 to exclude the burn line. This is an accommodation required due to the limitations of the black frit. The ideal would be to have no buffer 15 zone as the larger obscuration reduces the driver field of view and the natural light entering the vehicle.

One method used to address the burn line problem is the dot fadeout. Starting at the inner solid edge of the black paint, rows of increasingly smaller dots are painted on the glass. This is the same principle as used in greyscale printing. This reduces the rate of change in the surface temperature, spreading it over a wider area. The dot fadeout also helps to hide the distortion. However, on some parts, even a wide dot fadeout is not sufficient to eliminate all distortion. A wide dot fadeout also may not be possible depending upon the size of the opening and the regulatory requirements for driver vision. Dot fadeout patterns are also undesirable in that they increase the production cost of the glazing.

Another problem is surface mismatch. A laminate is comprised of at least two layers of glass. The frit is typically applied to only one of the glass layers. This can result is a slight difference in the shape of the surfaces. When the two surfaces are forced together during lamination, the mismatch results in residual stress in the laminate and optical distortion.

Even with these drawbacks, the area of the windshield with a black frit obscuration has increased in recent years.

As the electronic content of modern vehicles has increased, the area of the windshield, near the top center, has become increasingly crowded on many vehicles. Once the province of just the rear-view mirror, we now find a wide array of electronic equipment mounted in this location.

The use of cameras, requiring a wide field of view and a high level of optical clarity, is also growing at a rapid rate with the introduction of vehicles capable of various levels of autonomous operation. The resolution of the cameras is also increasing at an equally fast rate. These typically must be mounted on the windshield in the wiper area. Early initial applications were for night-vision. Today, camera-based systems are used to provide a wide array of safety functions including adaptive cruise control, obstacle detection, lane departure warning and support for autonomous operation. Many of these applications require the use of multiple cameras. A clear undistorted field of view, with minimal double imaging and excellent MTF (Modulation Transfer Function, a measure of how well a lens maps an image to a sensor), is especially critical for camera-based systems to perform as intended. It is essential for these systems to be able to quickly differentiate between objects, capture text, identify signage, and operate with minimal lighting. Further, as the resolution of the cameras used increases the need for a clear distortion free field of view increases.

While covers and various styling methods can be used to obscure the components and cables from the inside, we also need to maintain clean lines and a good aesthetic when the vehicle is viewed from the exterior.

Standard practice has been to extend the black enamel frit band, also called black band to create an obscuration on the fourth surface of the glass with openings in the obscuration to provide for the required camera field of view.

When the black band is extended downward from the top center black band to create an obscuration on the second surface of the glass or the fourth surface of the glass, distortion and stress can become a major problem. This is because the black frit is extending further from the edge into the area that where more heat must be applied to bend the glass. The large surface area of the obscuration increases the probability of breakage due to the surface defects and stress introduced by the frit. This is also a critical viewing area.

A panoramic windshield is a windshield in which the top edge of glass has been extended to include at least a portion of the roof giving the driver an extended vertical field of vision, as shown in FIG. 2. In the case of a panoramic windshield, the problem is even more pronounced as the black band obscuration 32, 8 extends or is located several cm from the top edge. This is the weakest point of the windshield. This is also where the highest temperatures are required to bend the glass which results in even higher thermal gradients and distortion.

Having examined the drawback of using a black enamel frit to produce an obscuration, especially in the area used for cameras on the windshield, it can be appreciated that it would be desirable to produce a windshield that did not have the limitations that result from a black enamel frit obscuration.

Brief Description of the Invention

The subject of the immediate invention is a laminated automotive glazing with a least one obscuration which is produced by creating an obscuration after heating and bending the glass by removing a portion of the plastic interlayer glass in or near the camera field of view (camera obscuration) or/and in the edges of the windshield (black band) and replacing with an inlay made of a substantially opaque plastic or other suitable material glass in or near the camera field of view (camera obscuration) or/and in the edges of the windshield (black band) which then serves as the obscuration as opposed to printing and firing an enamel frit onto the glass. The portion removed and the inlay may be composed of the same type of plastic used for the interlayer or any other suitable plastic or other material compatible with the lamination process. The portion removed as well as the inlay may be fabricated by means of CNC cutting (LASER, blade or ultrasonic), die cutting or any other method known in the art that is suitable for the material selected. The inlay is sized to just fit into the opening made in the plastic interlayer. The inlay can be added during the assembly of the laminate, in which case it may be placed in the opening with no need to bond the edges of the insert to the interlayer. Even so, a suitable solvent may be used to help bond the edges of the insert. Suitable solvents include but are not limited to alcohols and plasticizers. Application of the solvent may be made but brush, spray, roller, pad or any other convenient suitable means. The insert may be comprised of more than one segment. As an example, a two-camera system may require two transparent portions surrounded by an obscuration. An opening is cut in the interlayer sheet, sized for the obscuration, and the opaque plastic obscuration has two areas cut out to receive the transparent plastic for the two-camera field of view. If multiple plastic bonding layers (interlayers) are utilized, as in the case of a laminate comprising a film layer, only one of the plastic bonding layers may optionally be provided with the inlay.

Laminates made in this manner are stronger and have superior optical quality, especially in the areas of the laminate used by cameras.

Advantages

1. Best in class optics.
2. Frit induced surface defects are eliminated.
3. Residual stress caused by non-uniform heating of the frit is eliminated.
4. Residual stress caused surface mismatch due to the frit is eliminated.
5. Low distortion, comparable to ordinary clear glass.
6. Low double image, comparable to ordinary clear glass.
7. Lower probability of breakage.
8. Higher yield during bending due to elimination of non-uniform heating.
9. Higher yields during lamination due to higher strength, lower residual stress and less surface mismatch.

REFERENCE NUMERALS

Figure 1A:
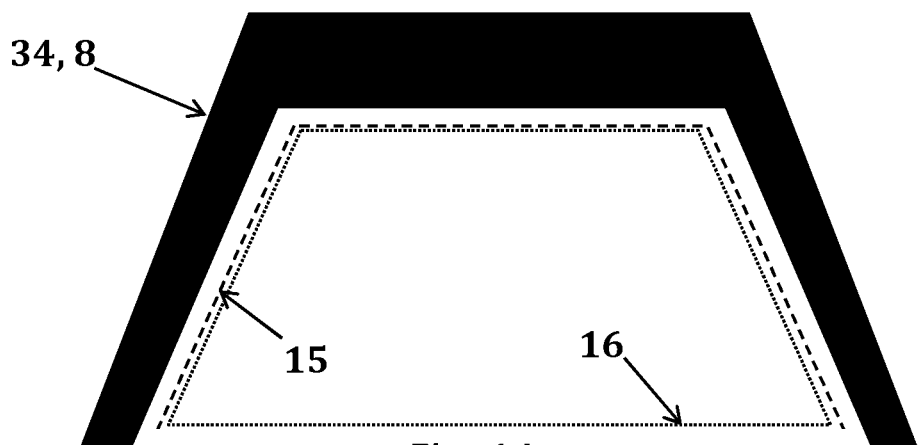
FIG. 1A shows a camera obscuration with "burn" line buffer.
Figure 1B:
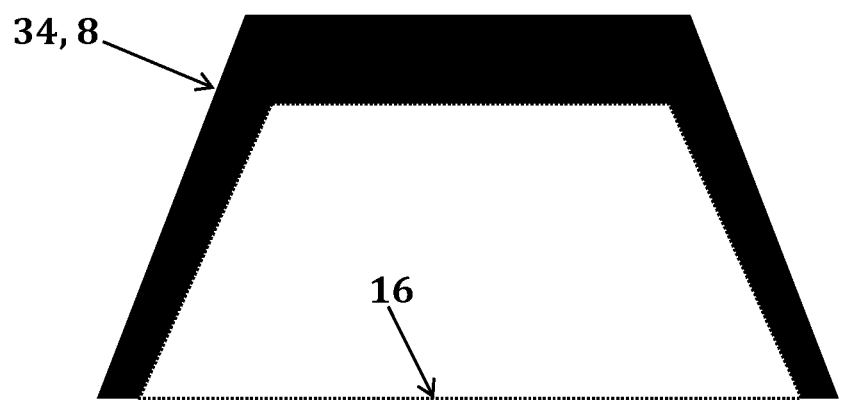
FIG. 1B shows a camera obscuration without burn line buffer.
Figure 2:
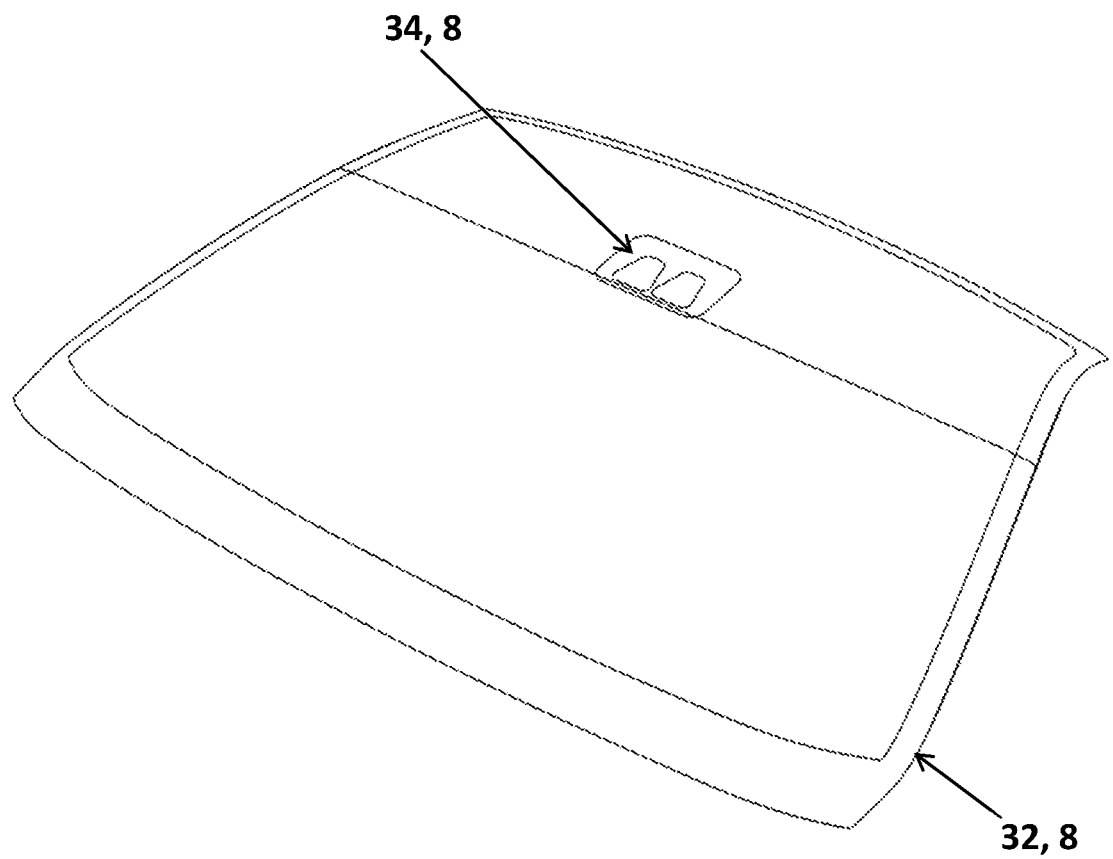
FIG. 2 shows an isometric view of panoramic windshield with camera obscuration and black band.

3 Wedge Interlayer
4 Plastic Bonding Interlayer
8 Obscuration
15 Buffer
16 Field of view
17 Film
32 Black Band
34 Camera Obscuration
40 Double image Angle
41 Observation point
42 Incident ray
43 Primary image
44 Secondary image
45 Wedge angle
46 Incident angle
52 Angle of deviation
56 Angle of inclination
101 First Surface of Glass
102 Second Surface of Glass
103 Third Surface of Glass
104 Fourth Surface of Glass
201 Outer layer
202 Inner layer

DETAILED DESCRIPTION OF THE INVENTION

The invention eliminates the drawbacks associated with the fired black frit obscurations of the prior art by using the alternate method of the invention to provide the obscuration for the camera field of view after the glass has been heated and bent to shape. Removing the black frit from the glass during the bending process allows for a more uniform heat distribution across the part during bending which reduces residual stresses and the associated surface mismatch, warping and distortion caused by the thermal gradients.

Laminated safety glass is made by bonding two sheets of annealed glass together using a thin sheet of a transparent thermo plastic bonding interlayer. Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic bonding interlayer also helps to prevent penetration by objects striking the laminate from the exterior and in the event of a crash occupant retention is improved.

Figures 3A, 3B:
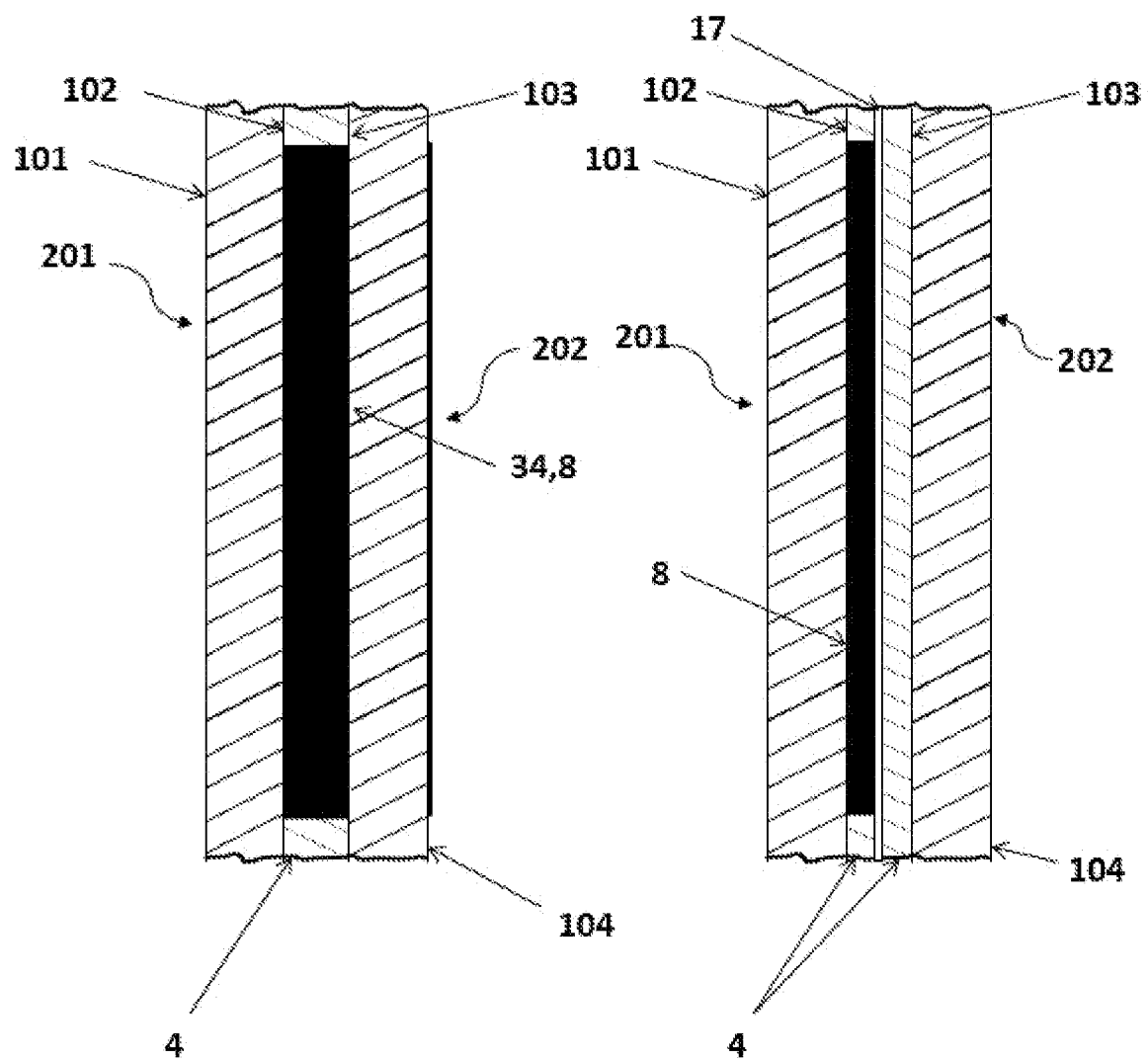
FIG. 3A shows a cross section of laminate with single plastic layer and inlay camera obscuration.
FIG. 3B shows a cross section of laminate with two plastic layers with film layer with inlay camera obscuration in outboard plastic layer.

In the drawings and discussion, the following terminology is used to describe the configuration of a laminated glazing. Typical automotive laminated glazing cross sections are illustrated in FIGS. 3A and 3B. A laminate is comprised of two layers of glass, the exterior or outer 201, and interior or inner 202 that are permanently bonded together by a plastic bonding interlayer 4. The glass surface that is on the exterior of the vehicle is referred to as the first surface of the glass 101. The opposite face of the outer layer is the second surface of the glass 102. The glass surface that is on the interior of the vehicle is referred to as fourth surface of the glass 104. The opposite face of the inner layer is the third surface of the glass 103. Second surface of the glass 102 and third surface of the glass 103 are bonded together by the plastic bonding interlayer 4. FIGS. 3A and 3B also contain an inlay camera obscuration 34, 8. Obscurations are commonly comprised of black enamel frit printed on either the second surface of the glass 102 or fourth surface of the glass 104 or on both. The invention proposes a dark inlay as an obscuration. The laminate may have a coating (not shown) on one or more of the surfaces. The laminate may also comprise a film laminated 17 between at least two plastic bonding interlayer 4.

The plastic bonding interlayer has the primary function of bonding the major faces of adjacent layers to each other. The material selected is typically a clear plastic when bonding one glass layer to another glass layer. For automotive use, the most commonly used plastic bonding layer is polyvinyl butyl (PVB). In addition to polyvinyl butyl, ionoplast polymers, ethylene vinyl acetate (EVA), cast in place (CIP) liquid resin and thermoplastic polyurethane (TPU) can also be used. Interlayers are available with enhanced capabilities beyond bonding the glass layers together. The invention may include interlayers designed to dampen sound. Such interlayers are comprised whole or in part of a layer of plastic that is softer and more flexible than that normally used. The interlayer may also be of a type which has solar attenuating properties.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment. In the chemical tempering process, ions in and near the outside surface of the glass are exchanged with ions that are larger.

This place the outer layer of glass in compression. Compressive strengths of up to 1,000 Mpa are possible.

The glass layers are formed using gravity bending, press bending, cold bending or any other conventional means known in the art. Gravity and press bending methods for forming glass are well known in the art and will not be discussed in the present disclosure.

The glass layers may be comprised of heat absorbing glass compositions as well as infrared reflecting and other types of coatings.

Tempered monolithic windows can only make use of heat absorbing compositions to control solar load. One of the big advantages of a laminated window over a tempered is that a laminate can make use of infrared reflecting coatings and infrared reflecting films in addition to heat absorbing compositions.

Infrared reflecting coatings include but are not limited to the various metal/dielectric layered coatings applied though magnetron sputtered vacuum deposition (MSVD) as well as others known in the art that are applied via pyrolytic, spray, controlled vapor deposition (CVD), dip and other methods.

Infrared reflecting films include both metallic coated substrates as well as organic based optical films which reflect in the infrared.

A heat absorbing window can be very effective, but the glass gets hot and transfers energy to the passenger compartment through convective transfer and radiation whereas the infrared reflecting coatings and films reflect the heat back to the atmosphere allowing the glass so stay cooler.

In addition to the metallic and non-metallic films that reflect in the infra-red, a wide variety of other films are available for use in laminates to add capability and enhance other properties. To control light transmission there are available: electro chromic, photochromic, thermocromic and field effect films which are designed to be incorporated into laminates. Of particular interest are suspended particle devices (SPD) and polymer dispensed liquid crystal (PDLC) films which can quickly change state under the control of an electrical field. These films will be collectively referred to as performance films.

Figure 4:
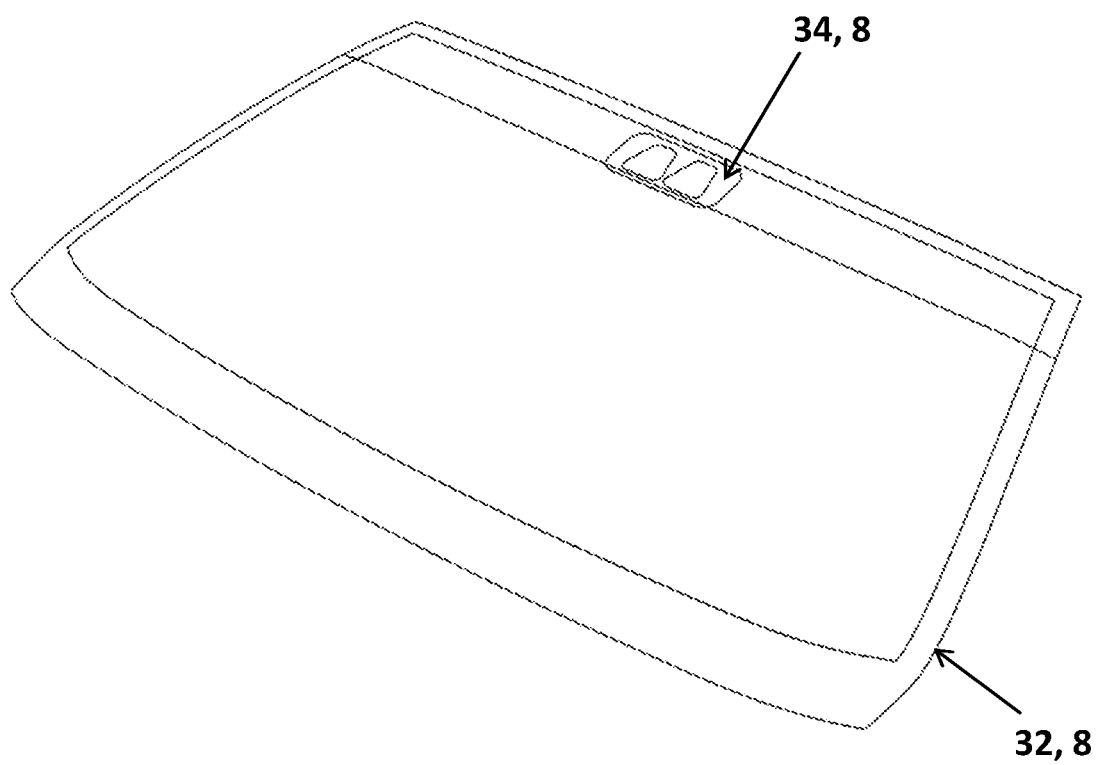
FIG. 4 shows an isometric view of windshield with gap between the camera obscuration and the black band.
Figure 5A:
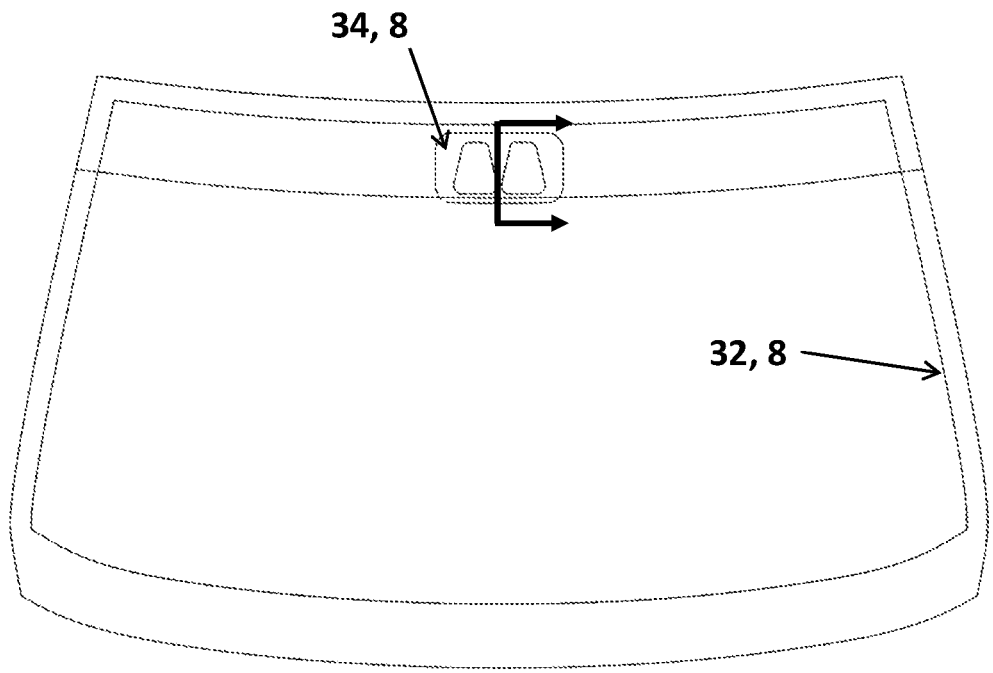
FIG. 5A shows a front view of windshield with gap between the camera obscuration and the black band.
Figure 5B:
FIG. 5B shows a camera obscuration detail showing black and clear portions.

If a combination of frit and the method of the invention are used for the obscurations 8, the black band 32 and the Camera obscuration 34, any difference in the appearance between the two may be noticeable. In that case, separating the Camera obscuration 34 from the black band 32, as shown in FIGS. 4 and 5 will improve the aesthetic.

In the obscuration areas where the invention is applied, all of the detrimental effects of the black enamel frit on the glass are eliminated resulting in superior optical quality, lower stress, and a lower probability of breakage.

In addition to the benefits to the finished laminate, the elimination of the non-uniform heating and high thermal gradient present in the black frit areas increases yields through the bending process and also, due to the higher strength and lower surface mismatch, increases yields through the lamination process.

Distortion in windshields is measured in terms of refractive power. Refractive power is the change in the angular deviation along over distance. At a high enough level, it can result in noticeable optical distortion. The refractive power is expressed in diopters.

$$D_\varepsilon = \frac{d\alpha_\varepsilon}{dx} \frac{1}{\cos\varepsilon} \qquad (1)$$

Where:
ε: angle formed between the incident ray of light and a line perpendicular to the surface normal of the glazing
$\alpha_\varepsilon$: angular deviation
$D_\varepsilon$: refractive power Most large windshield production lines utilize online automated inspection system which scan the glass and produce a contour map showing the optical distortion in diopters.

Laminates produced by this invention have significantly lower distortion in the areas near the obscurations as compared to the same and similar laminates produced with screen print black frit.

Figure 6A:
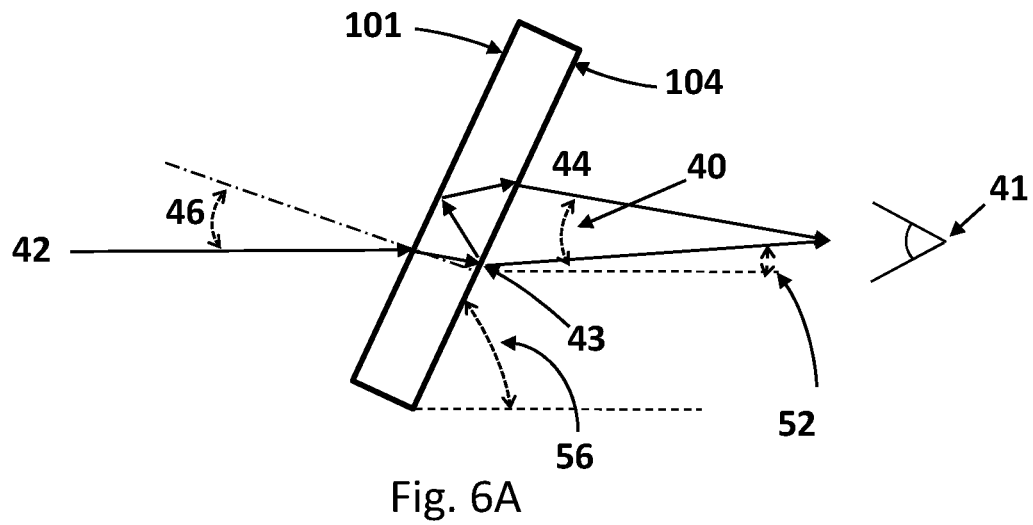
FIG. 6A shows a double image without correction.
Figure 6B:
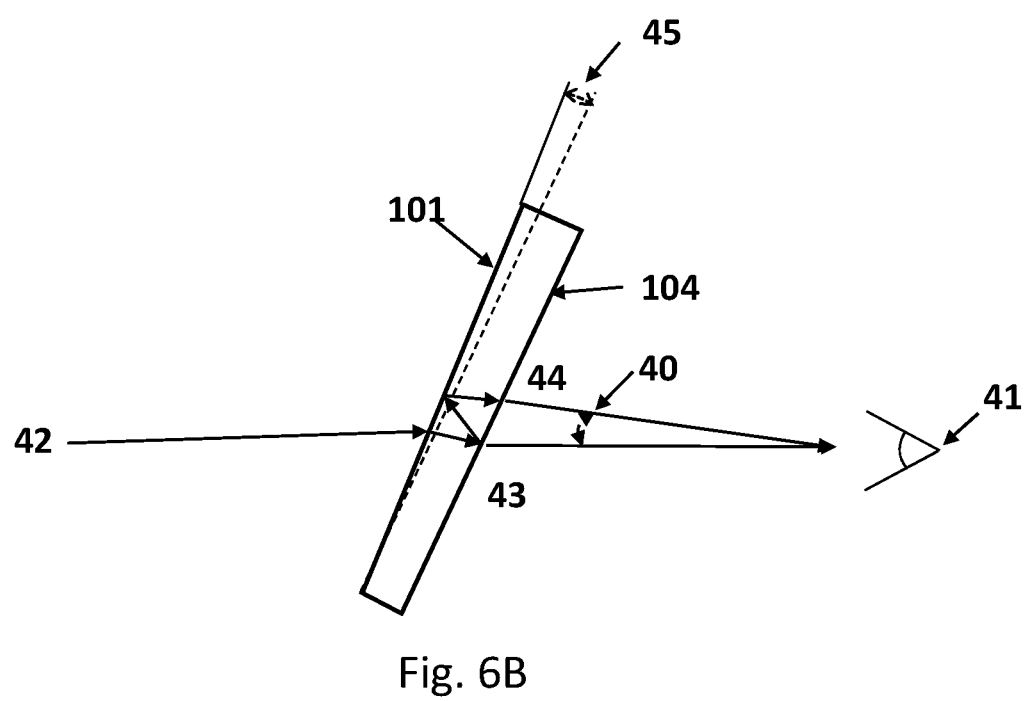
FIG. 6B shows a double image with wedge/shaped interlayer correction.

Double image, another problem of the prior art, is illustrated in FIGS. 6A and 6B.

An incident ray 42 of light enters the surface of the glass at an incident angle 46 and passes through the glazing to the observation point 41. The light bends (refracts) as it passes through the glazing The angle by which the light bends is known as the angle of deviation 52. This refraction of the light causes a shifting of the primary image 43 of the object observed.

Some of the light from the incident ray 42 entering the glass is reflected back from the inside surface (fourth surface of the glass 104) and exits the glazing. A portion of the reflected light is again reflected back from outside surface (the first surface of the glass 101) resulting in a double image. The double image angle η 40 is the angle between the primary image 43 and secondary image 44 and the observation point 41. If the primary and secondary images are coincident, then the separation angle is zero. Regulatory requirements limit the separation angle to 15 minutes of arc for vision zone A (as defined by United Nations Regulation 42, revision 3) and 25 minutes of arc for vision zone B. However, it is well known that the maximum amount of double imaging imperceptible for the human eye is 7 minutes of arc.

The double image angle, η 40, is calculated as shown in equation 2. It increases with decreasing the angle of inclination 56, increasing curvature of the fourth surface of the glass 104 and with increasing size of the glazing. The double image angle, η 40, can be reduced by altering the angle between the plies of glass as shown in FIGS. 7B y 7C. Normally, the glass surfaces are substantially parallel to each other. By creating a wedge angle 45 between the surfaces, the primary and secondary images can be shifted towards convergence.

$$\eta = \frac{2t\sin(\varepsilon)}{R\sqrt{n^2 - \sin(\varepsilon)^2}} \qquad (2)$$

where:
η: double image angle
t: thickness of the glazing
n: refractive index
R: radius of curvature The angle between the plies of glass is adjusted through the use of an interlayer that has a non-uniform thickness, typically tapering from a thickness greater than the standard 0.76 mm at or near the top of the glazing a lesser thickness at the bottom. Such interlayers are produced through extrusion of the plastic. Such interlayers are known as "wedge" interlayers. They can also be formed, to a lesser extent by shaping (stretching) of the interlayer. Shaping is typically done to create a curved sunshade. Table 1 shows the wedge angle and reduction in thickness for a standard 0.76 mm thick interlayer over 1 meter as a function of sunshade radius.

Note that wedge interlayer can be shaped to increase the wedge angle. Any combination of wedge and shaped interlayer can be used to obtain the desired results.

Figure 7A:
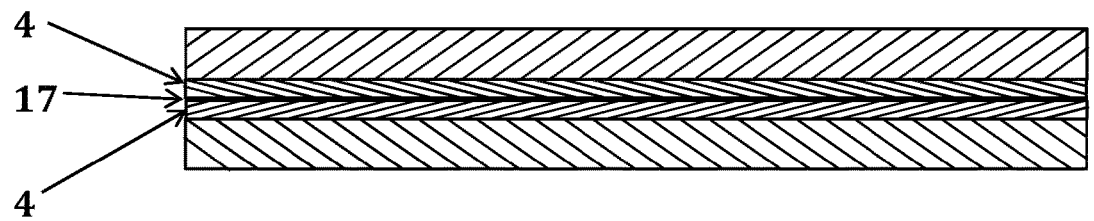
FIG. 7A shows a laminate with ordinary plastic interlayer.
Figure 7B:
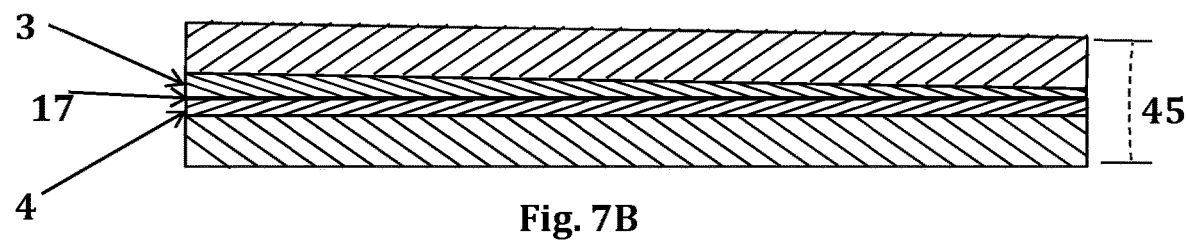
FIG. 7B shows a laminate with one ordinary plastic interlayer and one wedge/shaped plastic interlayer.
Figure 7C:
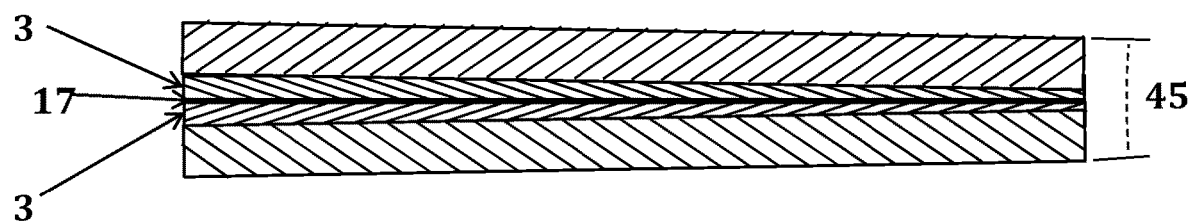
FIG. 7C shows a laminate with two wedge/shaped plastic interlayers.

FIG. 7A shows a laminate with two standard interlayers (plastic bonding interlayer 4), FIG. 7B shows a laminate with one wedge interlayer 3 with a film between them and FIG. 7C shows a laminate with two wedge interlayers 3 a film between them. Wedge interlayer 3 can be used to further reduce double vision.

TABLE 1

Sunshade Radius vs. Wedge Angle

| Sunshade Radius m | Interlayer Thickness mm | Wedge Angle mrad |
|---|---|---|
| 2.0000 | 0.5067 | 0.253 |
| 2.5000 | 0.5429 | 0.1017 |
| 3.0000 | 0.5700 | 0.190 |
| 3.5000 | 0.5911 | 0.169 |
| 4.0000 | 0.6080 | 0.152 |
| 4.5000 | 0.61018 | 0.138 |
| 5.0000 | 0.6333 | 0.127 |
| 5.5000 | 0.6431 | 0.117 |
| 6.0000 | 0.6514 | 0.109 |
| 6.5000 | 0.6587 | 0.101 |
| 7.0000 | 0.6650 | 0.095 |
| 7.5000 | 0.6706 | 0.089 |
| 8.0000 | 0.6756 | 0.084 |
| 8.5000 | 0.6800 | 0.080 |
| 9.0000 | 0.6840 | 0.076 |
| 9.5000 | 0.6876 | 0.072 |
| 10.0000 | 0.6909 | 0.069 |

Experimental results have demonstrated the remarkable and unexpected magnitude of improvement of the invention. Fracture strength is more than doubled, MTF is drastically improved (see Graph 1), distortion is reduced by a factor of six and double image if reduced from 15" to 3". One should also note that all four of these parameters are critical to the operation of a safety camera.

TABLE 2

|  | Laminate with Black Frit | Laminate with Obscuration Printed on Film |
|---|---|---|
| Fracture Strength (ring-on-ring) | 60 Mpa | 115 Mpa |
| Distortion (Camera window-5 mm from the black edge) | 150 milli diopters | 25 milli diopters |
| Double image (Camera window-5 mm from the black edge) | 15" (arc minute) | 3" (arc minute) |

As camera system for cars improve and cars now have advanced driving assisted systems the vehicles windshield becomes an important component of the complex lens system that makes up the vehicle vision system. For our interest here, our windshield serves as a lens in front of the camera, comprising one component of a complex lens system. The best way to evaluate this system is by measuring the MTF.

Modulation Transfer Function or "MTF" is the most widely used scientific method of describing lens performance. The modulation transfer function is, a measure of the transfer of modulation (or contrast) from the subject to the image. In other words, it measures how faithfully a lens reproduces (or transfers) detail from the object to the image produced by a lens. When we graph MTF we chart against contrast dropping from 100 to 0 and Spatial frequency (Nyquist frequency). Spatial frequency is the ability to resolve over distance and as contrast drops this ability gets weaker. Plotting this in X&Y gives us the total systems contrast and its ability to faithfully reproduce into the distance. This is especially important in semi-autonomous or autonomous driving vehicles as the focus will be the horizon and all images in the focal plane will need to be detectable both in shape and in size.

Obscurations produced by the method of the invention have resulted in a remarkable improvement in system MTF as compared to the same production model with a normal frit obscuration.

Embodiment 1

Figure 8:
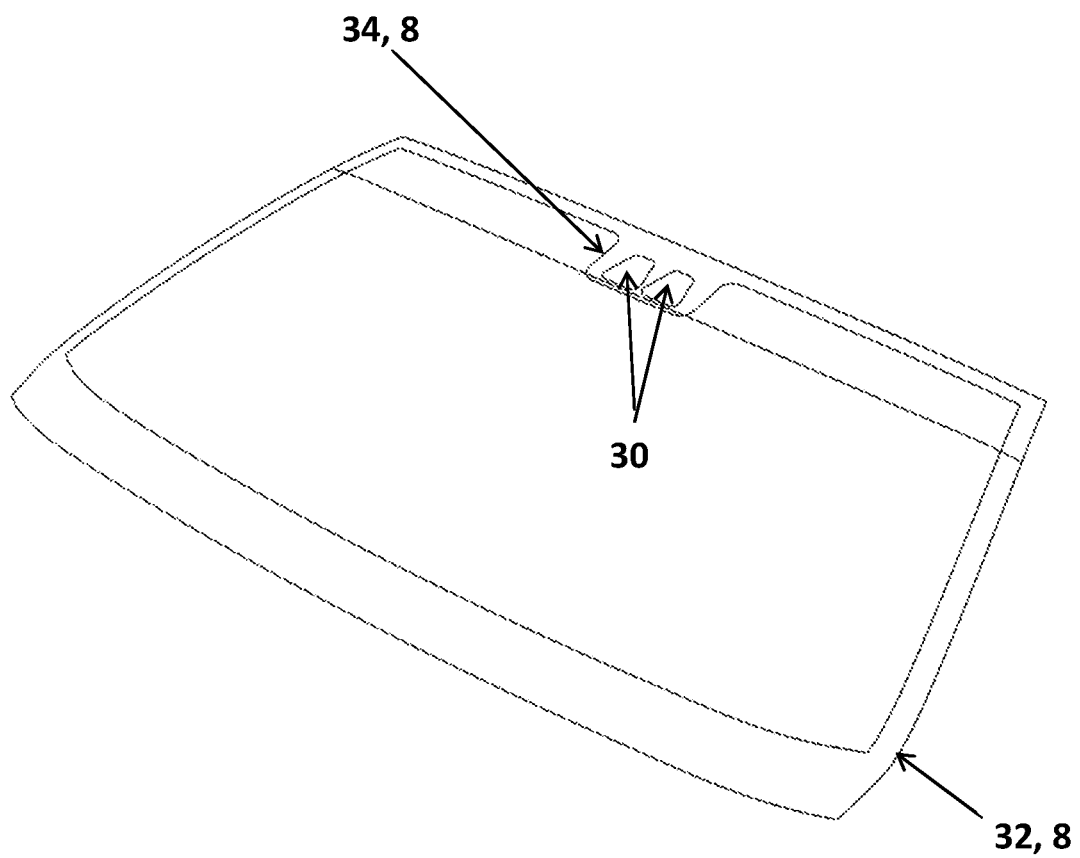
FIG. 8 shows an isometric view of windshield with camera obscuration that overlaps the black band

The windshield of FIG. 8 comprising a ceramic frit black band 32 and a camera obscuration 34 produced by means of on opaque black plastic PVB inlay, cut to size and inserted into a cutout in the plastic PVB interlayer. The inlay further comprising cutout within allowing for insertion of transparent PVB in the field of view for each of the two cameras. The inlay is assembled after bending and cooling of the glass during the lamination process at the point where the interlayer is normally inserted in to the assembly. No adhesion promoters are needed.

Embodiment 2

The windshield of FIG. 8 comprising two wedge/shaped plastic interlayers sandwiching between them an infra-red heat reflecting PET film. A ceramic frit black band 32 is produced through ordinary means and an opaque black plastic PVB inlay, is cut to size and inserted into a cutout in the PVB interlayer. The inlay further comprises a cutout within allowing for insertion of transparent PVB in the field of view for each of the two cameras. The inlay is assembled after bending and cooling of the glass during the lamination process at the point where the interlayer is normally inserted in to the assembly. No adhesion promoters are needed.

It must be understood that this invention is not limited to the embodiments described and illustrated above. A person skilled in the art will understand that numerous variations and/or modifications can be carried out that do not depart from the spirit of the invention, which is only defined by the following claims.

What is claimed is:

1. A laminate comprising:
   an outer glass layer having two oppositely disposed major faces;
   an inner glass layer having two oppositely disposed major faces;
   a plastic bonding interlayer disposed between and connecting opposite major faces of outer and inner glass layers, wherein said plastic bonding interlayer comprises at least one opening; and
   at least one obscuration disposed between the outer glass layer and the inner glass layer, wherein each obscuration of said at least one obscuration is an opaque inlay made of an opaque material inserted into an opening of said at least one opening.

2. The laminate of claim 1 wherein said at least one obscuration is at least two obscurations, a camera obscuration and a black band obscuration.

3. The laminate according to claim 1, wherein the inlay is an opaque plastic.

4. The laminate according to claim 3, wherein the opaque plastic is an opaque black plastic.

5. The laminate according to claim 4, wherein the plastic bonding layer and the opaque inlay are composed of the same type of plastic.

6. The laminate according to claim 5, wherein the plastic is a PVB interlayer.

7. The laminate according claim 1, wherein an opaque inlay of said at least one obscuration comprises at least one cutout in which a transparent plastic is inserted.

8. The laminate according to claim 7, wherein the opaque inlay comprising at least one cutout is a camera obscuration.

9. The laminate according to claim 7, wherein the transparent plastic is a PVB.

10. The laminate according to claim 1, further comprising a ceramic frit black band.

11. The laminate according to claim 10, wherein said at least one obscuration is a camera obscuration, and wherein the camera obscuration is separated from and spaced from the ceramic frit black band.

12. The laminate according to claim 1, wherein the laminate is a windshield.

13. The laminae according to claim 1, wherein the plastic bonding interlayer is selected from the group consisting of polyvinyl butyl (PVB), ethylene vinyl acetate (EVA), and thermoplastic polyurethane (TPU).

14. The laminate of claim 1 further comprising one or more additional plastic bonding interlayers.

15. The laminate of claim 14 wherein at least one plastic bonding layer is a wedge interlayer.

16. The laminate of claim 14 further comprising a film disposed between two plastic bonding interlayers.

\* \* \* \* \*